June 13, 1950   F. G. BUHRENDORF ET AL   2,511,195
RECORDING PEN CHECK MECHANISM Filed April 30, 1948   3 Sheets-Sheet 1

INVENTORS   F.G. BUHRENDORF
            F. DERMOND
BY
            ATTORNEY

June 13, 1950

F. G. BUHRENDORF ET AL 2,511,195

RECORDING PEN CHECK MECHANISM

Filed April 30, 1948

INVENTORS F.G.BUHRENDORF
F.DERMOND
BY
*W. Dawson*

ATTORNEY

June 13, 1950 F. G. BUHRENDORF ET AL 2,511,195
RECORDING PEN CHECK MECHANISM
Filed April 30, 1948 3 Sheets-Sheet 3
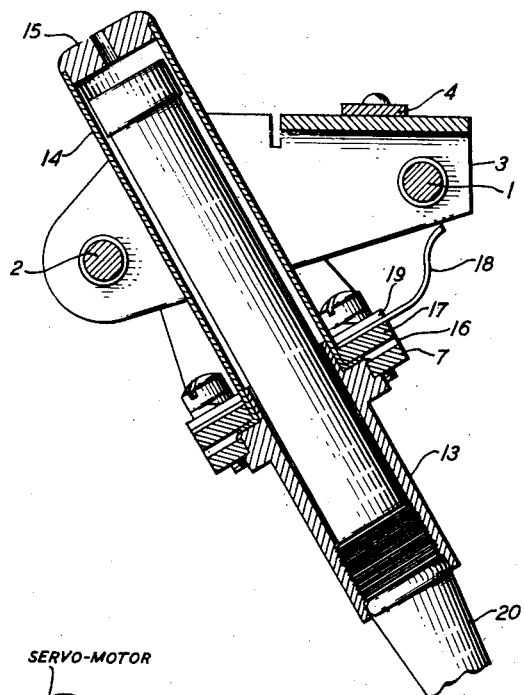
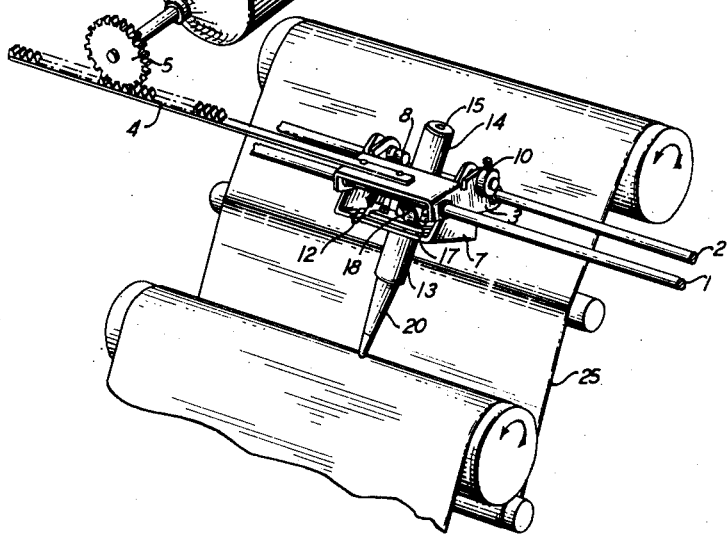
INVENTORS F.G. BUHRENDORF
F. DERMOND
BY
ATTORNEY Patented June 13, 1950

2,511,195

UNITED STATES PATENT OFFICE 2,511,195

RECORDING PEN CHECK MECHANISM

Frederick G. Buhrendorf, Westfield, and Franklin Dermond, Wayne Township, Passaic County, N. J., assignors to Bell Telephone Laboratories, Incorporated, New York, N. Y., a corporation of New York Application April 30, 1948, Serial No. 24,214

5 Claims. (Cl. 346—139)

1

This invention relates to mechanism for protecting a delicate instrument from injury due to forcible contact with a surface and is particularly useful in recording machines.

The object of the invention is a selective latching device which, when the instrument is dropped or forced down, will prevent the instrument from coming in contact with the surface; but, when the instrument is lowered gently, will permit the instrument to come into contact with the surface.

A feature of the invention is a bracket pivoted to the recording carriage and carrying the recording instrument. A spring extending between the recording carriage and the bracket tends to rotate the bracket and bring the instrument into contact with the surface.

Another feature of the invention is a pawl pivoted to the carriage and extending between two studs on the bracket, so that the pawl will be raised by one of the studs when the bracket is rotated to raise the instrument from the surface. When the bracket is freely released, or forced down, a projection on the pawl engages the other stud preventing the instrument from coming into contact with the surface; but, when the bracket is lowered slowly, the projection on the pawl passes the other stud, permitting the instrument to come into contact with the surface.

In the drawings:

Fig. 7 is a detail view, in part section, of a preferred means for securing a specific type of instrument to the bracket; and Fig. 8 is a general view of the complete carriage, traversing mechanism and recording surface.

Figure 1:
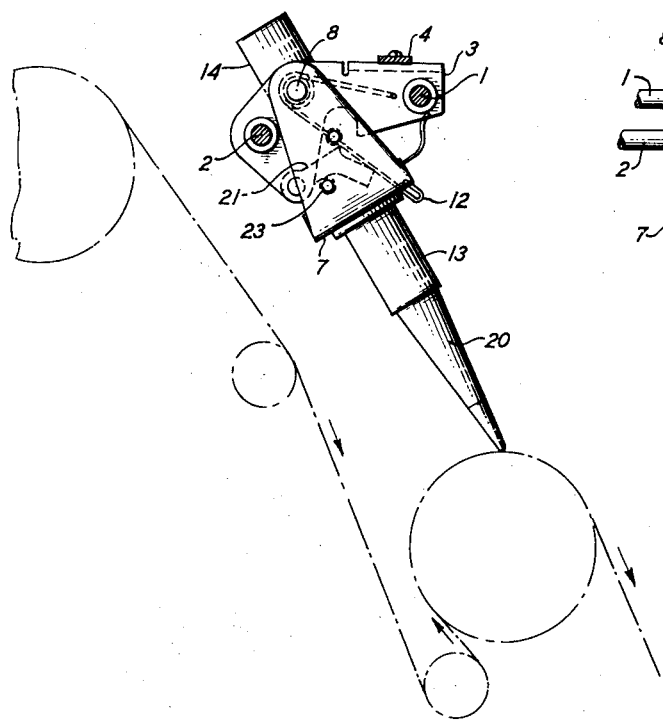
Fig. 1 is a side view of the carriage, bracket and instrument.

The rails 1, 2 may be mounted in, or supported by, any suitable part (not shown) of the framework of the recorder, or of a subframework. The

2 pen carriage 3 may be slidably mounted upon the rails 1, 2, and may be traversed in accordance with the values to be recorded by any suitable means, symbolically represented by the rack 4, traversed by the gear 5 on the shaft of the servomotor 6, rotated proportionally to the values to be recorded. The present invention is not limited to the specific form of drive illustrated, which may be replaced by many other known forms of drive, such as a pulley on the shaft of the motor driving a cable attached to the pen carriage, a threaded shaft driven by the motor and driving a nut attached to the pen carriage, or any other suitable device. If desired, the pen carriage may be stationary and the record surface 25 may be moved laterally in accordance with the values to be recorded.

Figure 2:
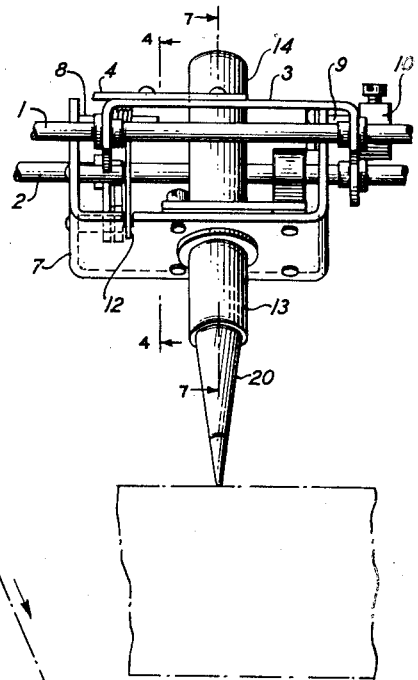
Fig. 2 is a front view of the rails, carriage, bracket and instrument.
Figure 3:
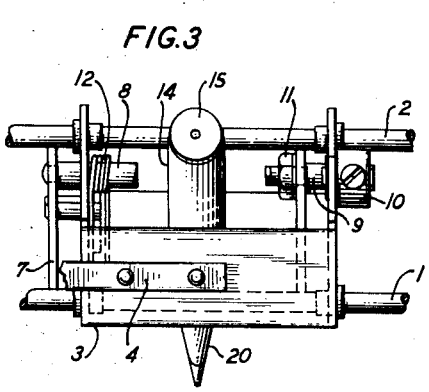
Fig. 3 is a top view of Fig. 2.

The pen bracket 7 depends from the pen carriage 3, on the pivot 8, and stub shaft 9, shown most clearly in Figs. 2 and 3. A portion of the shaft 9 may be reduced in diameter to form a shoulder bearing against the bracket 7, and be secured in any suitable way, as by staking, riveting, or by the nut 11. The outer end of shaft 9 protrudes through a hole in the carriage 3 and may be secured by the collar and set screw 10. In this way, by loosening the collar 10, the pen bracket 7 may be adjusted laterally with respect to the carriage 3, then retained by the collar and set screw 10.

One end of a spring 12 is inserted in a hole in the carriage 3, the spring is coiled round the inner end of the pivot 8, and the other end of the spring rests in a notch cut in the bracket 7. The spring 12 is tensioned so as to tend to rotate the bracket 7 to the recording position.

Any suitable type of recording device may be mounted upon the bracket 7. In the present case, a suitable form of mounting for a commercial type of ball point pen is illustrated, but the invention is not limited to this specific recording device. An internally threaded socket 13 projects through a hole in the bracket 7 and is shaped to form a shoulder abutting against the outer face of the bracket 7, and a corner which is securely staked to the inner face of the bracket 7. A tube 14, closed at the upper end by the perforated cap 15 is slipped over the projecting end of the socket 13. A spacer 16 and plate 17 are slipped over the tube 14. A flat spring 18 and clamp plate 19 are placed on top and the whole assembly screwed to the bracket 7. The pen 20 is slipped into the socket 13 until the thread on the barrel of the pen 20 engages the internal thread of the socket 13 and is then screwed securely in place. The flat spring 18 is shaped to engage the rail 1 and hold the bracket 7 when the pen 20 is fully rotated away from the recording surface.

A pawl 21 is mounted upon a headed rivet 22 riveted in a hole in the carriage 3. A spacer (not shown) may be placed between the pawl 21 and carriage 3 to insure free rotation of the pawl. A stud 23 is riveted in the bracket 7 and engages the lower surface of the pawl 21. A spur is formed on the upper surface of the pawl 21 and a stud 24 is riveted in the bracket 7. The carriage 3 is cut away to permit the full movement of the stud 24.

Figure 5:
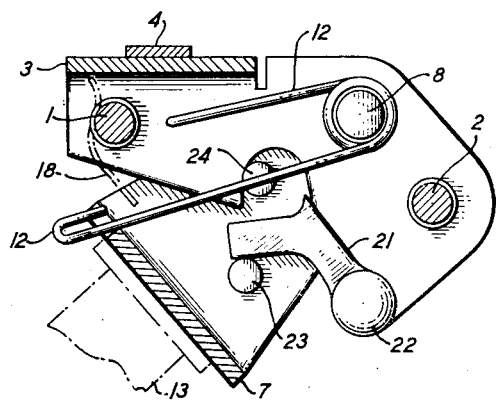
Fig. 5 is a detail view, in part section, of the carriage, bracket and pawl when the instrument is fully raised from the surface.

Fig. 5 shows the relative positions of the parts when the bracket 7 is fully rotated to lift the pen from the recording surface, the spring 18 is fully engaged with the rail 1, the spring 12 is fully compressed, and the stud 23 has raised the pawl 21 to its upper position.

Figure 4:
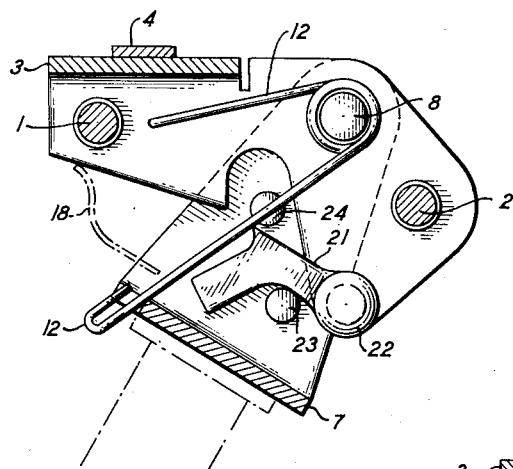
Fig. 4 is a detail view, in part section, of the carriage, bracket and pawl when the instrument is in contact with the surface.

If the movement of the pen is retarded, so as to lower the pen gently into contact with the recording surface, the pawl 21 will continuously be in contact with the stud 23, and the spur on the pawl 21 will just clear the stud 24, as shown in Fig. 4.

Figure 6:
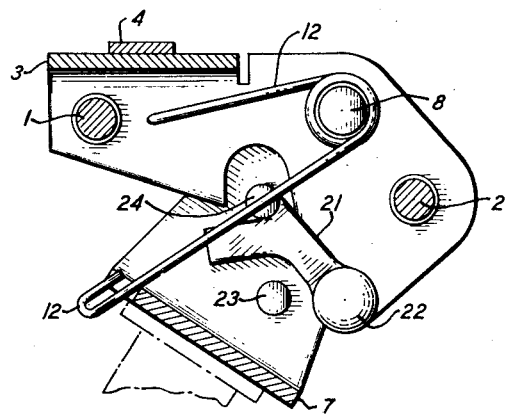
Fig. 6 is a detail view, in part section, of the carriage, bracket and pawl when the pawl is engaged with one of the studs to prevent the bracket from rotating to bring the instrument into contact with the surface.

If the pen is forced down from the position shown in Fig. 5, or permitted to move under the impulse of the spring 12, the bracket 7 will rotate faster than the pawl 21, thus, as shown in Fig. 6, the pawl 21 will lose contact with the stud 23, and the spur on the pawl 21 will engage the stud 24, preventing the pen from coming in contact with the recording surface, thus protecting the point of the pen.

While the elements 23, 24 have been illustrated as studs riveted to the bracket 7, it is evident that any suitably shaped projections, or abutments, may be used, such as small tongues of metal punched out of the bracket 7; or the bracket 7 may be shaped to present a surface to the pawl 21, pierced by an aperture so disposed that the lower edge of the aperture replaces the stud 23, and the upper edge of the aperture replaces the stud 24.

The selective latching action of the pawl 21 results from the bracket 7, when freely released, having a higher rotational or angular velocity than the angular velocity of the pawl 21. In the present case, the recoil of the spring 12 causes the bracket 7 to have a higher angular velocity than the pawl 21, but there evidently are other ways in which this difference in velocity may be attained. For example, if the spring 12 be omitted and the bracket 7 be permitted to turn freely under the influence of gravity, a disc of friction material may be associated with the pawl 21 so that the pawl 21, under the influence of gravity, will rotate with lower angular velocity than the bracket 7.

What is claimed is:

1. Mechanism for protecting a delicate instrument from injury due to forcible contact with the surface of a member comprising a support adjacent to the surface, a bracket attached to the instrument and pivoted to depend from the support, said bracket being shaped to form two abutments, a pawl pivoted to said support and having a lower surface capable of bearing upon one of said abutments and an upper surface shaped to form a projection, and means associated with the pivoted supports of said bracket and said pawl, so proportioned that, when freely released, said bracket will rotate faster than said pawl, whereby the projection on the pawl is caused to engage the other of said abutments and prevent said instrument from coming in contact with said surface.

2. The combination in claim 1 in which said means is a spring extending from said support to said bracket and exerting pressure on said bracket.

3. Mechanism for protecting a recording instrument from injury due to forcible contact with a recording surface comprising a support adjacent to the recording surface, a bracket attached to the recording instrument and pivoted to depend from the support, the bracket being shaped to form two abutments, a pawl pivoted to the support and having a lower surface bearing on one of said abutments and an upper surface shaped to form a projection and means associated with the bracket and pawl so proportioned that, when freely released from an elevated position, the bracket will rotate faster than the pawl, causing the pawl to rise from said one abutment whereby the projection on the pawl is brought into engagement with the other abutment preventing the recording instrument from coming in contact with the recording surface.

4. The combination in claim 3 in which said means is a spring extending from the support to the bracket and exerting pressure on the bracket.

5. In a recording machine, a recording surface, a recording carriage slidably supported adjacent to said surface, a bracket pivoted to depend from the carriage, a pair of studs secured to said bracket, a recording device attached to said bracket, a spring extending from the carriage to the bracket and exerting pressure on the bracket, a pawl pivoted to the carriage and extending between the studs, said pawl having a projection formed to engage one of said studs when said recording device is freely released from an elevated position to prevent the recording device from coming in contact with the recording surface.

FREDERICK G. BUHRENDORF.
FRANKLIN DERMOND.

REFERENCES CITED

The following references are of record in the file of this patent:

UNITED STATES PATENTS

| Number | Name | Date |
| --- | --- | --- |
| 2,424,776 | Stapleton | July 29, 1947 |
| 2,426,301 | Ellis et al. | Aug. 26, 1947 |